United States Patent

Leonard

[15] 3,686,437

[45] Aug. 22, 1972

[54] ELECTRONIC COMPENSATION FOR OPTICAL SYSTEM FOCAL LENGTH VARIATION

[72] Inventor: Murray Leonard, Edison, N.J.

[73] Assignee: Gulton Industries, Inc., Metuchen, N.J.

[22] Filed: Oct. 14, 1970

[21] Appl. No.: 80,719

[52] U.S. Cl........178/7.6, 178/DIG. 29, 178/DIG. 36, 250/219 WD, 356/160

[51] Int. Cl................................................H04n 3/26

[58] Field of Search...178/7.1, 7.2, 7.7, 7.6, DIG. 36, 178/DIG. 29; 356/158, 160, 167; 250/219 WD, 219 LG, 236

[56] References Cited

UNITED STATES PATENTS 2,935,558 5/1960 Van Winkle........178/DIG. 29
3,222,453 12/1965 Whitesell et al...........178/7.6
3,328,585 6/1967 Briguglio................178/7.6 X
3,538,334 11/1970 Shaffer, Jr. ............250/236 X
3,546,468 12/1970 Takahashi...............178/7.6 X
3,555,280 1/1971 Richards, Jr...........250/236 X
3,560,647 2/1971 Harmon.............178/DIG. 29

*Primary Examiner*—Robert L. Richardson
*Attorney*—Darby & Darby

[57] ABSTRACT

Variations in focal length of an optical scanning system are electronically compensated for. The optically-derived information (derived by scanning an object) is converted to a corresponding digital representation, and compensation for fixed offset and proportional scanning errors due to focal length variations is made using digital circuitry.

11 Claims, 5 Drawing Figures

INVENTOR.
MURRAY LEONARD
BY
Darby + Darby
ATTORNEYS

ELECTRONIC COMPENSATION FOR OPTICAL SYSTEM FOCAL LENGTH VARIATION

This application relates to optical scanning systems and, more particularly, to apparatus for electronically compensating for errors resulting from variations in the focal length of the optical system employed.

Many different kinds of scanning optical systems are known and used to effect measurements of objects or for use as character or pattern recognition systems. The optical systems in such devices may consist of lenses and mirrors of various shapes which are caused to move. Light beams of coherent or non-coherent light are used in conjunction with these optical systems to scan a selected object or surface. The scanned light beam is then either directly or indirectly sensed by a photoelectric pickup device which converts the scanned light energy into an electrical analog (video) signal. In the systems of interest here, the analog signal is then converted into a digital quantity.

Optical systems using lenses or mirrors generally are of the collecting or focusing type and have a magnification factor associated with it. This optical system magnification is a direct function of the focal length of the optical system. The conversion of the analog signal representative of the optically derived information into digital form requires the selection of a digitizing frequency which in turn is calculated by using the system magnification and other factors relating to the overall system. The correct digitizing frequency must be carefully chosen so that a predetermined system scale factor may be properly calculated.

Thus, unless precise determination of the optical system focal length (and therefore system magnification) is known, exact translation of the image information into a digital quantity cannot be made. The present technology requires that precise determination of an optical system focal length be determined or that an optical system using ground lenses or other optical elements be extremely precisely manufactured so that the desired optical parameters are created. Knowing the exact focal length of the particular optical system, the system magnification can be calculated. Based upon the determination of this system magnification and taking into account other system factors, the correct digitizing frequency may be chosen.

It is apparent that when many systems must be produced, this method becomes impractical due to the high cost of producing identical optical systems or the necessity of using a different digitizing pulse generator (clock) for each system which is not interchangeable with the other systems.

The present invention describes a method and apparatus where a group of optical systems can be readily fabricated with randomly ground lenses, which systems may be assembled without regard to focal length and which may be electronically compensated for normal variations in the system magnification.

It is therefore an object of the present invention to provide improved optical scanning systems wherein the focal length variations of these optical systems are electronically compensated.

It is also an object of this present invention to provide optical scanning apparatus which may be fabricated with randomly ground optical elements.

It is another object of this invention to provide optical scanning systems wherein the optical systems are assembled without regard to focal length.

It is still another object of the present invention to provide optical scanning systems wherein the scanned information is converted to digital form and wherein the same digitizing frequency may be used for a plurality of systems without compromising system performance.

It is a still further object of the present invention to provide methods for the production and assembly of optical scanning systems manufactured with randomly ground optical elements, assembled without regard for focal length and electronically compensated for expected variations in the system magnification.

In accordance with the invention, in an optical scanning system having optical means for scanning and focussing incident light energy on an object, the optical means having a predetermined focal length, the value of said focal length lying within a fixed ranged about some preselected nominal value and wherein deviations from said nominal focal length in a given optical system result in fixed and proportional scanning errors; the optical scanning system also including means for receiving light energy and for transducing the light energy into a representative electronic signal; the optical scanning system additionally has means for converting the representative electronic signal into digital form; the improvement in the optical scanning system comprising digital means for electronically correcting for fixed and proportional scanning errors.

For a better understanding of the present invention, together with other and further objects thereof, reference is made to the following description taken in connection with the accompanying drawings. The scope of this invention will be pointed out in the appended claims.

Figures 1, 2:
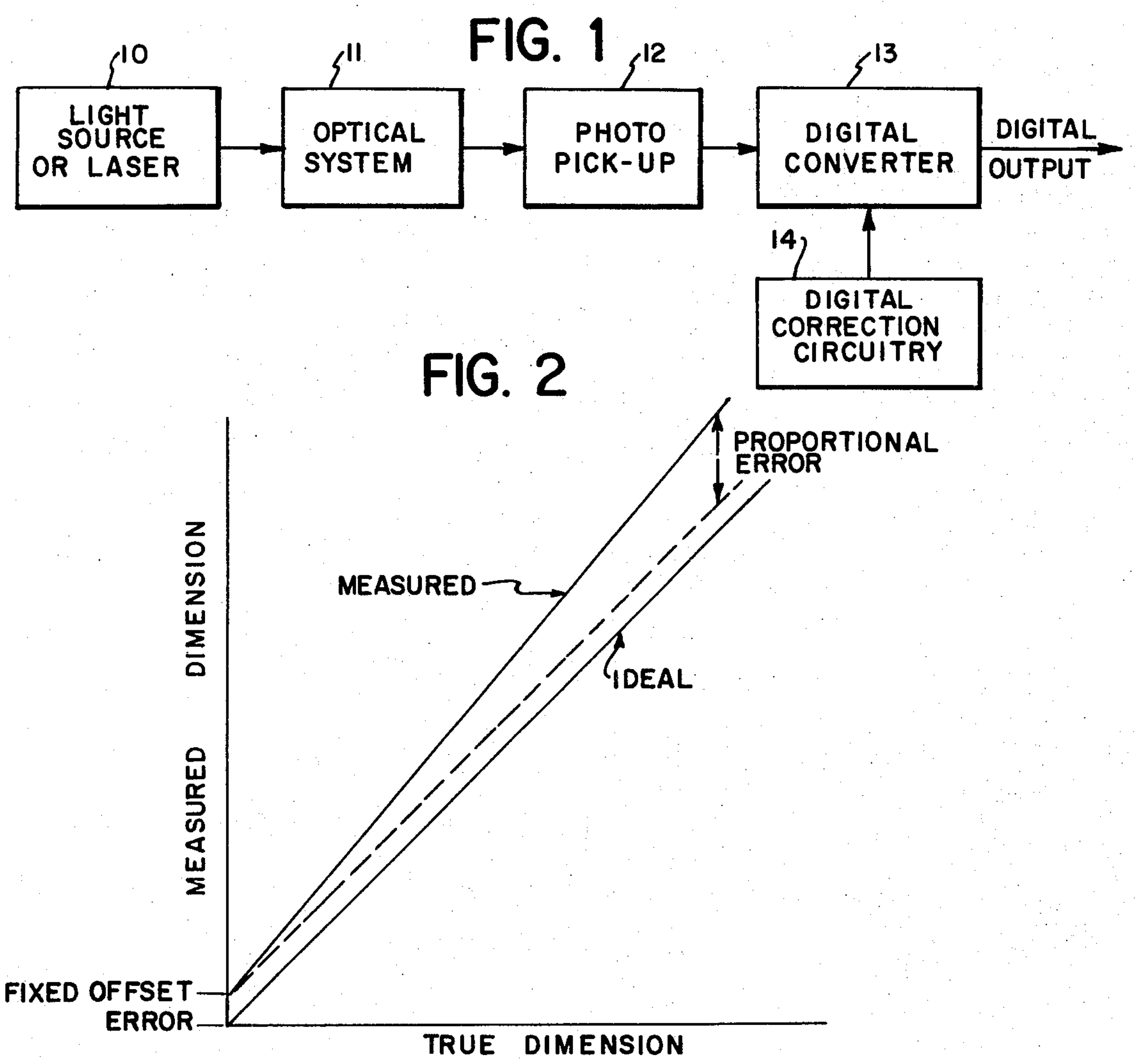
FIG. 1 represents a block diagram of an optical scanning system in accordance with the present invention.
FIG. 2 represents a graph depicting the proportional and fixed system errors associated with optical system focal length error.

Referring initially to FIG. 1, a supplied source of light 10, which may be of coherent or incoherent type, is directed toward an optical system 11 which is used to collect and focus the incident light. While any optical system which relies upon optical magnification and system focal length can be used with the present invention, two particular kinds of optical systems are mentioned here. In one form of optical scanning system called moving lens scanning, the lens is either translated or rotated so that collected light is directed to a slit located at an image plane through which the focussed light may pass. Behind the slit is an appropriate photoelectric pickup device (shown as 12 in FIG. 1). In moving beam scanning arrangements, the laser or other light source is directed at a reflecting rotating polygon which in turn is directed through a lens or mirror at an object to be scanned, the scanned light thereupon collected by another lens which is directed at a photoelectric pickup device.

The photo pickup device 12, which may be a photomultiplier tube, photo diode or other light-to-electrical signal transducer, converts or transduces the incident light energy into a video-type analog signal. This signal may then be supplied to an appropriate analog-to-digital converter 13 which gives the required digital output. In the present invention, the digital conversion is corrected by digital correction circuitry 14 as shown in FIG. 1.

The basic scanning optical system requires that when video information is generated for purposes of subsequent conversion of data to digital form, a pulse generator or clock must be coupled to the optical system to provide the source of digitizing pulses. It is important that the clock frequency be in synchronism with the scanning rate of the optical system. Thus, the clock frequency is typically counted down digitally until a lower frequency is obtained which may be used as a drive frequency for the optical scanning.

The basic optical system, which as stated previously is a magnifying system with a prescribed focal length, inherently has certain errors associated with this focal length. Typical lens systems may possess an error of plus and minus 3 percent in focal length, for example. (It should be noted throughout that virtually any expected tolerance may be compensated for by the method described here.)

Referring now to FIG. 2, the exact system effect of focal length error is shown. The ordinate in that figure represents the measured dimension of an object; the abscissa, the true dimension. The ideal curve represents where the measured dimension is the true dimension (note that this curve passes through the origin). The measured curve is seen to have two components of error in relation to the ideal curve. The fixed offset error is shown by the displacement of the measured curve in its intersection with the measured dimension axis. In addition, a proportional error is represented by linearly increasing deviation from a line parallel to the ideal curve.

Thus, it is seen that an error in the focal length from that desired will have associated with it two components of error in the digitized output. One component is associated with a fixed offset; and the second component is a proportional error which results from the cumulative effect of the focal length error during scanning.

The present invention uses electronic means to compensate for both these errors. An important feature of the present invention is that the digitizing frequency is intentionally chosen to be higher than the nominal value. This forces the fixed error to be positive under all conditions (if the digitizing frequency is chosen to be high) so that the total negative spread of the focal length tolerance is exceeded. For example, if the variation in focal length of a spread of plus or minus 3 percent exists for any group of lenses which may be ground and supplied to produce a particular set of optical systems, the digitizing frequency is chosen to make the nominal focal length 4 percent lower than the previous nominal. This would mean that the error of any particular optical system would always be positive with respect to the new nominal optical focal length. The importance of choosing a digitizing frequency to make the fixed focal length error positive is that the compensation circuitry necessary to remove the fixed focal length error is greatly simplified. Referring again to the graph of FIG. 2, there the fixed offset error is shown as being positive and by so choosing the digitizing frequency to correspond to a nominal optical focal length which is less than the lowest possible, it is insured that the fixed offset would be as indicated on the graph of FIG. 2, that is, positive.

Figure 3:
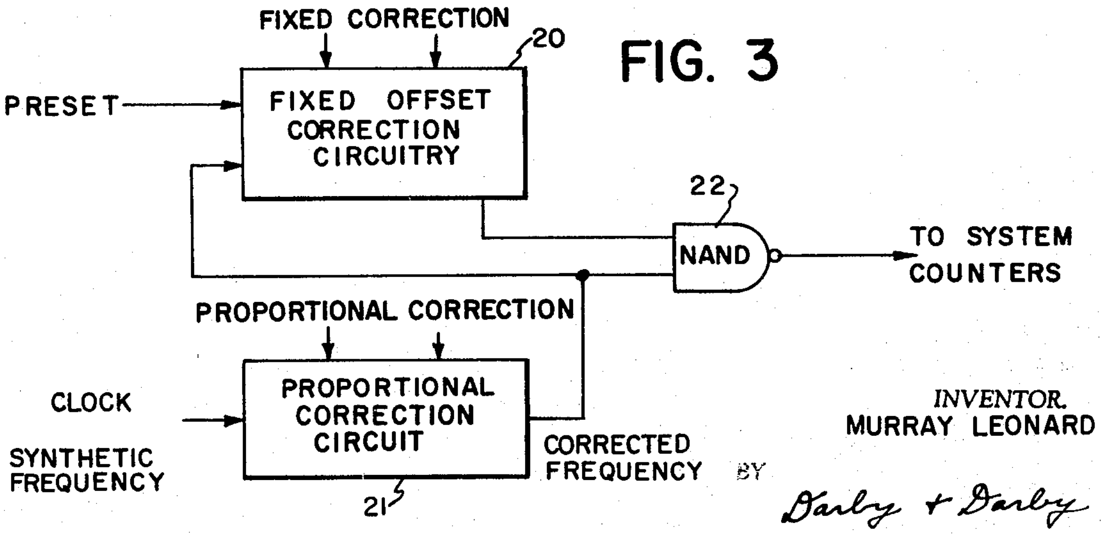
FIG. 3 represents a functional block diagram of the error correcting circuitry.

With the guarantee that the fixed offset errors will be positive, the necessary compensation circuitry is shown in FIG. 3. As indicated in that figure, there are two major functional elements which compensate for the two types of errors. The fixed offset correction circuitry 20 is basically a counter which accepts a predetermined preset value corresponding to the necessary fixed correction. The counter is then supplied with clock pulses which reads the counter out. The output of the counter is used to block the normal pulse flow to the main system counters (not shown) until the counter is completely read out. The blockage of the pulse flow effectively acts to subtract the number of pulses corresponding to the fixed offset and therefore corrects for it.

The proportional correction circuitry 21 operates on the synthetic clock frequency or digitizing frequency. After the appropriate proportional correctional factor is inserted into the circuitry 21 the correction circuitry acts to delete pulses in proportion to the factor set in for correction. The output of the correction circuitry 21 is an output pulse stream, the average frequency of which is reduced by a constant of proportionality which has been programmed into the correction circuits. This effectively corrects for the type of proportional error shown in FIG. 2. As indicated in FIG. 3, the corrected frequency is used to supply the fixed offset circuitry 20 with corrected clock pulses so that the two correction circuits can operate in synchronism.

The output of the two correction circuits is brought to NAND-circuit 22 which performs the necessary gating of the corrected frequency output of circuit 21 as it is controlled by the fixed offset circuitry 20. The output of NAND-circuit 22 is thereupon fed to the appropriate system counters.

Figure 4:
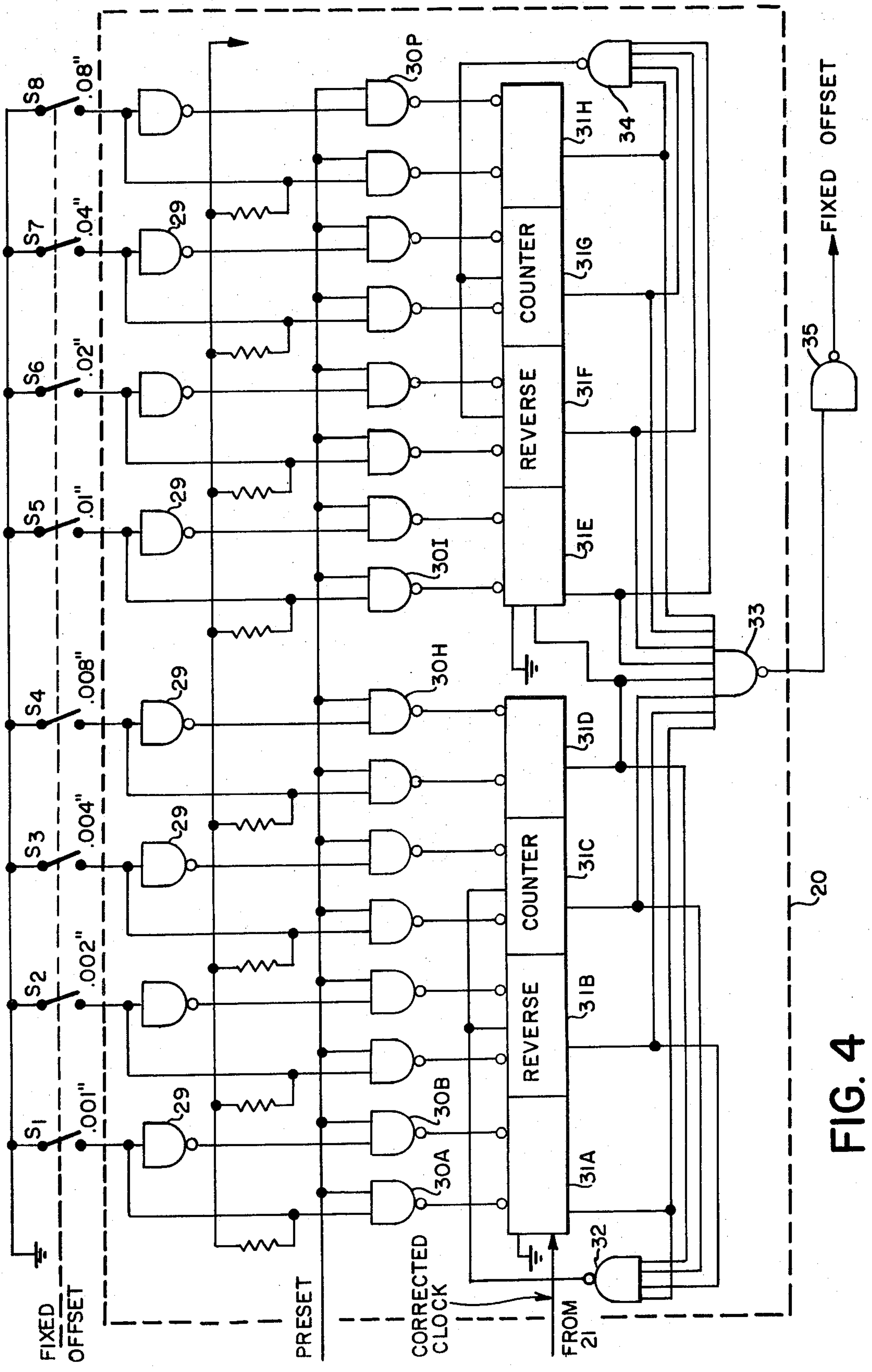
FIG. 4 represents a logic circuit diagram of the fixed error correcting block shown in FIG. 3.
Figure 5:
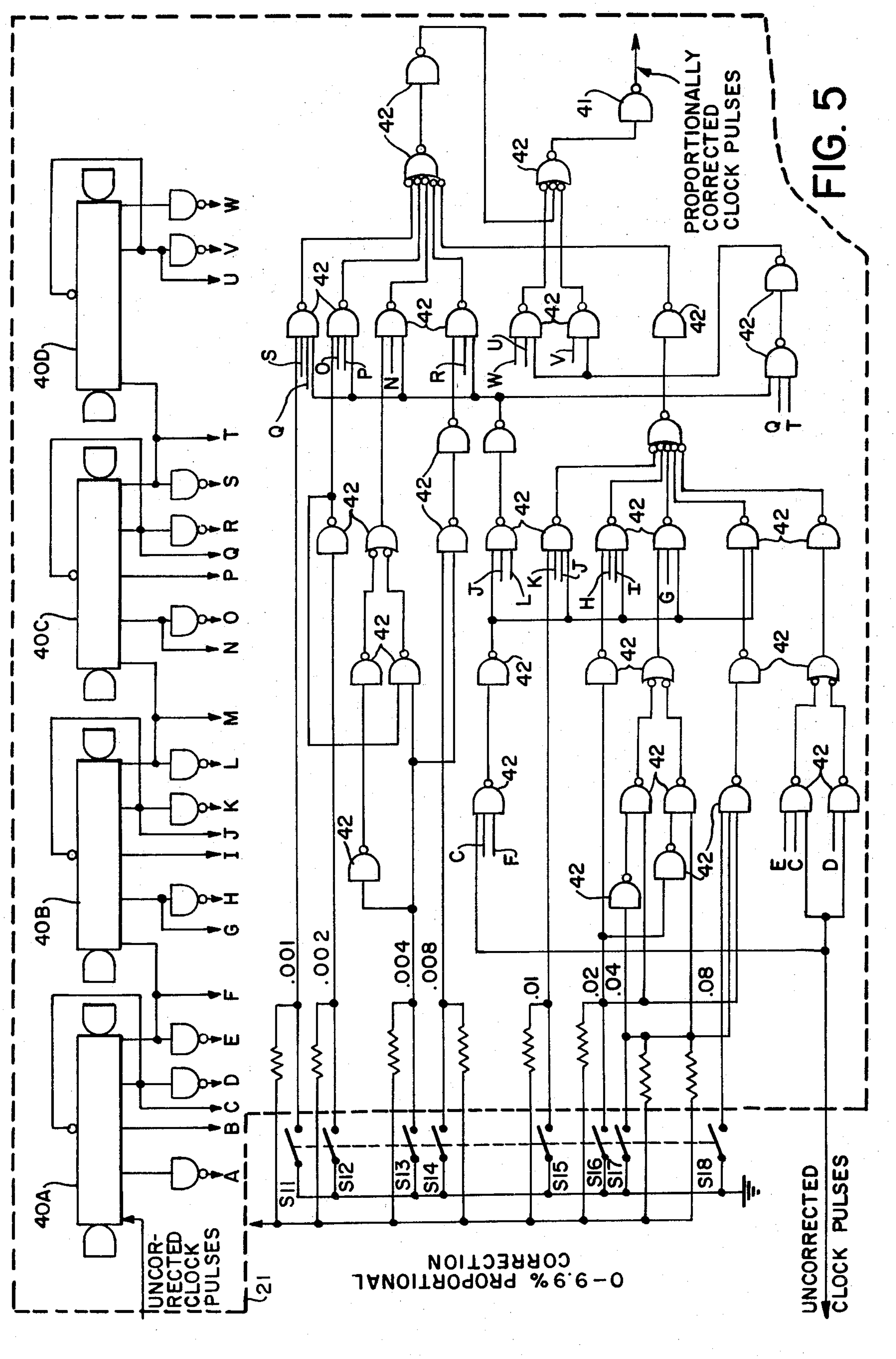
FIG. 5 is a logic circuit diagram of the proportional error correcting block shown in FIG. 3.

While there may be a number of different circuits which may effect the functions indicated in the overall block diagram of FIG. 3, FIGS. 4 and 5 illustrate one example of such compensation circuitry in detail. One example in which the present system was successfully adopted was in an application of a digital bar diameter gage used to measure the projected dimension of a hot or cold rod or bar. In that system, the optical apparatus employed a laser beam as a source of coherent light and a rotating polygon as a means of optical scanning. In the circuitry of FIGS. 4 and 5, the correction factors shown represent typical parameters used in the diameter gage measurement mentioned above.

FIG. 4 represents the fixed offset correction circuitry. The heart of the correction circuitry is a reverse counter 31 which, in the example shown, is an eight bit counter. A set of eight switches S1 thru S8, is mechanically available to insert the weighted "ones" and "-zeros" necessary to preset the counter. In the present example, the various bits are weighted from 0.001 inches to 0.08 inches. Thus, the correction circuitry in FIG. 4 is capable of compensating for fixed offsets of up to 0.165 inches, if all the switches were closed. The expected fixed focal length errors for the particular optical system considered was up to 0.099 inches. The switches supply the necessary offset information to a series of gates 29 which act to invert the switch information. Both true and inverted or complementary information is supplied to a set of control gates 30A through P. These gates are controlled by an external "-preset" signal which, at the appropriate time, enables the gates 30A through P to transmit the fixed offset information. When the preset enables gates 30A through P to function, the information provided by the switches is applied to the counter stages in signal pairs representing the true and complementary information supplied by the switches. This information appropriately presets the counter stages to their proper value. The counter is appropriately connected via gates 32 and 34 to operate in the reverse mode. That is, while a forward counter will count up the number of pulses entering it, a reverse counter will start with a given value and count down towards zero until zero is reached. The output of the different counter stages are gated in NAND gate 33 which will change its stage when all the counter stages read zero. The output of gate 33 is inverted by inverter 35 and the output of 35 represents a signal which changes at the moment in time when the fixed offset has been subtracted from the pulses entering correction circuitry 20.

FIG. 5 illustrates the proportional correction circuitry 21. The blocks 40A, B, C, and D represent four stages of a forward counter. These forward counter stages effectively produce lower frequencies than the uncorrected clock pulses which enter the counter. In the example referred to, the clock frequency was 2.273760 Mhz produced by a crystal oscillator. The combinations of these various frequencies produce controlling voltages for a complex array of gates indicated generally as 42 in FIG. 5. The forward counter 40 produces signals A through W which act as controls for different ones of the gates 42. A series of switches, in this example S11 through S18, also provides information as to the proportional reduction needed as a correction factor. These switches provide necessary signals to various ones of the gates 42. In the bar gage measurement example referred to above, eight switches were capable of providing a correction of up to 9.9 percent in proportional error. The combination of the timing wave forms A through W and the manually inserted correction information supplied by switches S11 through S18 operate to delete a number of pulses in proportion to the correction desired. For example if a 5 percent proportional correction were required, this circuitry would delete 1 pulse every twenty pulses. Since the digitized scanned information is measured by the total number of pulses over a given time it is seen that deleting pulses periodically will result in a lower average frequency output and therefore a proportionally corrected signal.

Referring again to FIG. 3, the output of proportional correction circuit 21 is both supplied as an input clock to fixed offset correction circuitry 20 and to the output NAND gate 22. After the fixed offset is removed by correction circuitry 20, NAND gate 22 opens and the corrected frequency is transmitted to the appropriate system counters.

Thus, it is seen that a system has been produced which permits the manufacture of optical scanning systems of high accuracy in mass production without the need to provide precision optical systems for each unit. The necessary corrections can be made completely electronically, after the necessary determination of how much correction of both fixed and proportional type need be made. If an optical component is selected at random, as long as it is within the prescribed range of tolerance, a series of measurements may be made of the optical system to produce an error curve such as that shown in FIG. 2. This is easily done with the electronic correction either deleted or disabled during the measurement. Knowing the amount of fixed and proportional correction needed, these factors are easily inserted in the correction circuitry by the appropriate switches and the overall system will thereafter automatically compensate for the fixed offset and proportional scanning errors.

The embodiment of this invention which has heretofore been referred is one involving a precision measurement made with an optical scanning system. It is also apparent that the invention may be used in pattern or character recognition or detection systems or, in fact, any scanning optical system where the focal length of the system will adversely affect the digitized information derived from the scanning process.

While there has been described what is at present considered to be the preferred embodiment of the present invention it will be obvious to those skilled in the art that various changes and modifications may be made therein without departing from the invention and it is therefore aimed to cover all such changes and modifications as falling within the true spirit and scope of the invention.

What is claimed is:

1. In an optical scanning system of the type having optical means for focusing incident light energy on an object, said optical means having a predetermined actual focal length, the value of said focal length lying within a fixed range about some prescribed value and wherein deviations from said prescribed focal length result in fixed and proportional system scanning errors, means for receiving scanned light energy and for transducing said light energy into a representative electronic signal, and also means for electronically converting said representative electronic signal into digital form, wherein the improvement comprises:

means for electronically correcting for fixed and proportional scanning errors resulting from any difference between the value of the actual focal length in said optical means and said prescribed value.

2. In an optical scanning system of the type having optical means for focusing incident light energy on an object and scanning said light energy across said object, said optical means having a predetermined actual focal length, the value of said focal length lying within a fixed range about some prescribed value and wherein deviations from said prescribed focal length result in fixed and proportional system scanning errors, means for receiving scanned light energy and for transducing said light energy into a representative electronic signal, and means for converting said representative electronic signal into digital form, wherein the improvement comprises:

means for providing a digitizing signal to effect said digital conversion, said signal having a frequency causing said fixed scanning error for said optical means to be always either greater than or less than the error corresponding to a reference focal length value lying outside of said fixed range;

and means responsive to said digitizing signal for electronically correcting said digital form of electronic signal for fixed and proportional system scanning errors resulting from any difference between the value of said actual focal length and the value of said prescribed focal length.

3. The optical scanning system of claim 2, wherein said digitizing signal frequency is selected to correspond to a particular focal length to achieve a desired system scale factor and said digitizing signal frequency is chosen to be higher than the frequency which corresponds to the minimum focal length of said fixed range whereby the fixed system error will always be positive.

4. The apparatus of claim 2, including means for disabling the correcting means so that the necessary fixed and proportional correction factors may be measured.

5. The scanning system of claim 4, wherein said digitizing signal is a train of pulses and the correcting means includes a proportional correction circuit for periodically deleting pulses of said digitizing signal to provide a corrected digitizing signal which is compensated for proportional system scanning errors.

6. The scanning system of claim 4, wherein the correcting means also includes a fixed correction circuit and an output gate each responsive to said corrected digitizing signal, said fixed correction circuit providing a delayed output signal for blocking said gate from transmitting the corrected digitized signal to main system counters for a duration of time corresponding to the offset error in digital form so that the offset error may be compensated for.

7. The apparatus of claim 5, wherein the proportional correction circuit includes means for manually inserting signals corresponding to the measured correction factor.

8. The apparatus of claim 6, wherein the fixed correction circuit includes means for manually inserting signals corresponding to the measured correction factor.

9. The apparatus of claim 8, wherein said measured correction factor signals are in digital form and wherein said fixed correction circuitry includes a presettable reverse counter, said counter being preset at a predetermined time by said measured correction factor signals in digital form, said counter being supplied with said corrected digitizing signal so that the counter may read out, said counter output acting to block said output gate until said counter reads zero.

10. The apparatus of claim 7, wherein the proportional correction circuitry includes a forward counter responsive to said digitizing signal for producing a plurality of lower frequency signals and also includes a plurality of gates responsive to said lower frequency signals, to said digitizing frequency and to said manually inserted measured correction factor signals, said gates operating to block the transmission of digitizing pulses at appropriate times corresponding to the amount of proportional correction required so that the proportional correction is effected by the reduction of the average frequency of the digitizing signal.

11. A method for correcting for fixed and proportional system scanning errors caused by focal length variation in optical elements of an optical scanning system, the output of said system being a digital electronic representation of scanned light energy, said output digital representation effected by a predetermined digitizing signal comprising:

measuring the fixed error and proportional scanning errors resulting from the focal length variation in said optical elements;

converting said measured errors into digital fixed and proportional correction signals;

selecting a digitizing signal frequency which is higher than that corresponding to the maximum expected variation in optical focal length from a prescribed focal length; and inserting said fixed and proportional correction signals and said digitizing signal into a digital correcting circuitry, whereby said system output may be compensated for said fixed and proportional system scanning errors.

* * * * *